United States Patent [19]

Brunet

[11] Patent Number: 4,709,772
[45] Date of Patent: Dec. 1, 1987

[54] MOTORIZED MOVING DEVICE

[76] Inventor: Pierre Brunet, 12 Rue Ancienne Ferme, 38120 Saint-Egreve, France

[21] Appl. No.: 822,040

[22] Filed: Jan. 24, 1986

[30] Foreign Application Priority Data

Jan. 31, 1985 [FR] France ............................ 85 01389

[51] Int. Cl.⁴ .................... B62B 5/02; B60B 19/00
[52] U.S. Cl. .................................. 180/8.2; 280/5.26
[58] Field of Search .................... 180/7.1, 8.2, 8.3; 280/5.2, 5.26; 340/689; 200/61.02; 250/231 R; 33/366

[56] References Cited

U.S. PATENT DOCUMENTS

| 3,283,398 | 11/1966 | Brown | 180/8 |
| 3,348,518 | 10/1967 | Forsyth | 180/8.2 |
| 3,450,219 | 6/1969 | Fleming | 180/8.2 |
| 3,580,344 | 5/1971 | Floyd | 180/8 |
| 4,222,449 | 9/1980 | Feliz | 180/8.2 |
| 4,566,707 | 1/1986 | Nitzberg | 180/8.2 |
| 4,571,844 | 2/1986 | Komasaku | 33/366 |

FOREIGN PATENT DOCUMENTS

| 019927 | 5/1984 | European Pat. Off. . |
| 3150193 | 12/1981 | Fed. Rep. of Germany . |
| 2050542 | 2/1971 | France . |
| 2502090 | 3/1981 | France . |
| 0110569 | 7/1982 | Japan ................................... 180/8.2 |

Primary Examiner—John A. Pekar
Attorney, Agent, or Firm—Ratner & Prestia

[57] ABSTRACT

A motorized moving device is provided of the type comprising a chassis equipped for receiving a person or an object to be transported and an axle mounted for pivoting on the chassis in the lower region thereof, the axle comprising, fixed to each of its ends, a frame which pivotally supports at least three wheels, a first reversible drive means adapted for rotating the axle and second reversible drive wheel for selectively rotating the wheels independently of the rotation of said axle, wherein said first drive means drives said frame through hollow outer shafts integral with said frame and said second drive wheel drives said wheels through inner shafts which are coaxial with and are pivotally received in said outer shafts.

6 Claims, 10 Drawing Figures

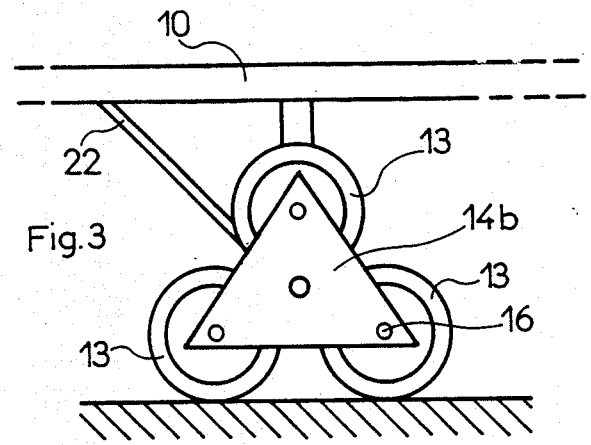
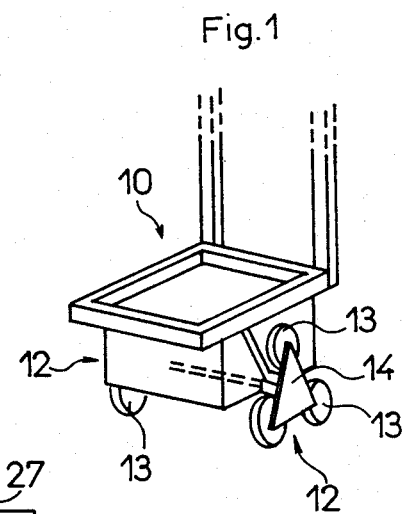
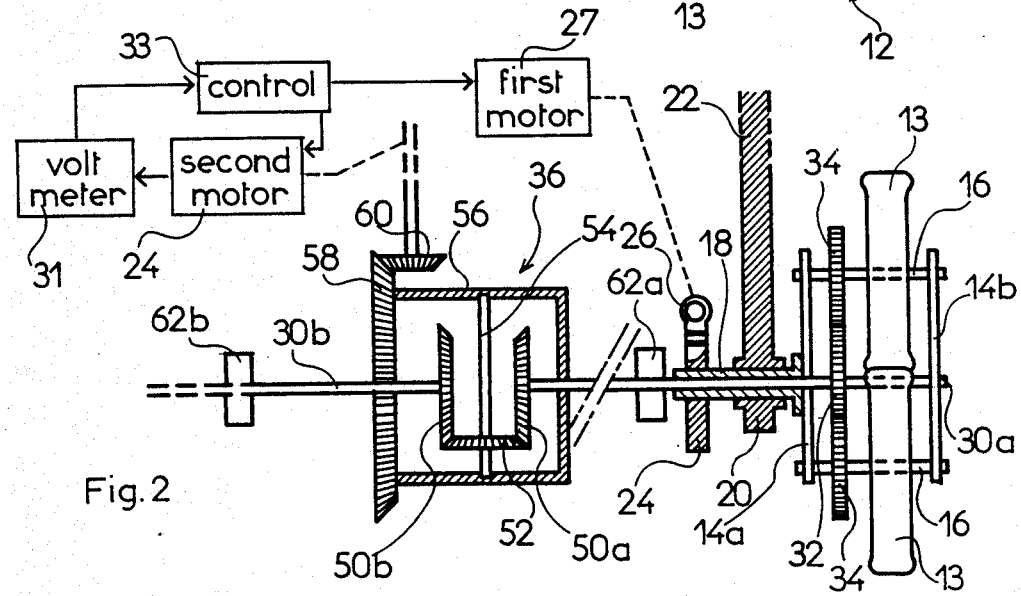
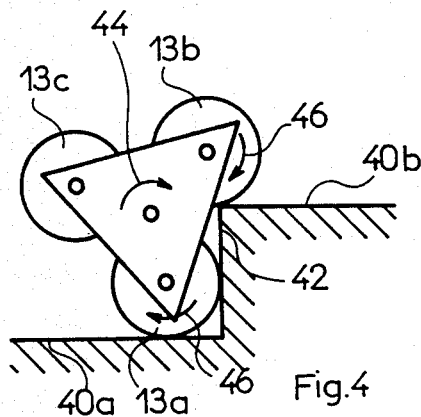
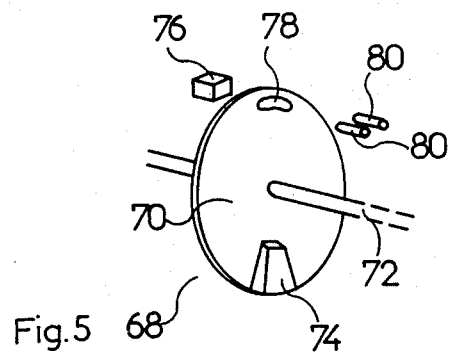

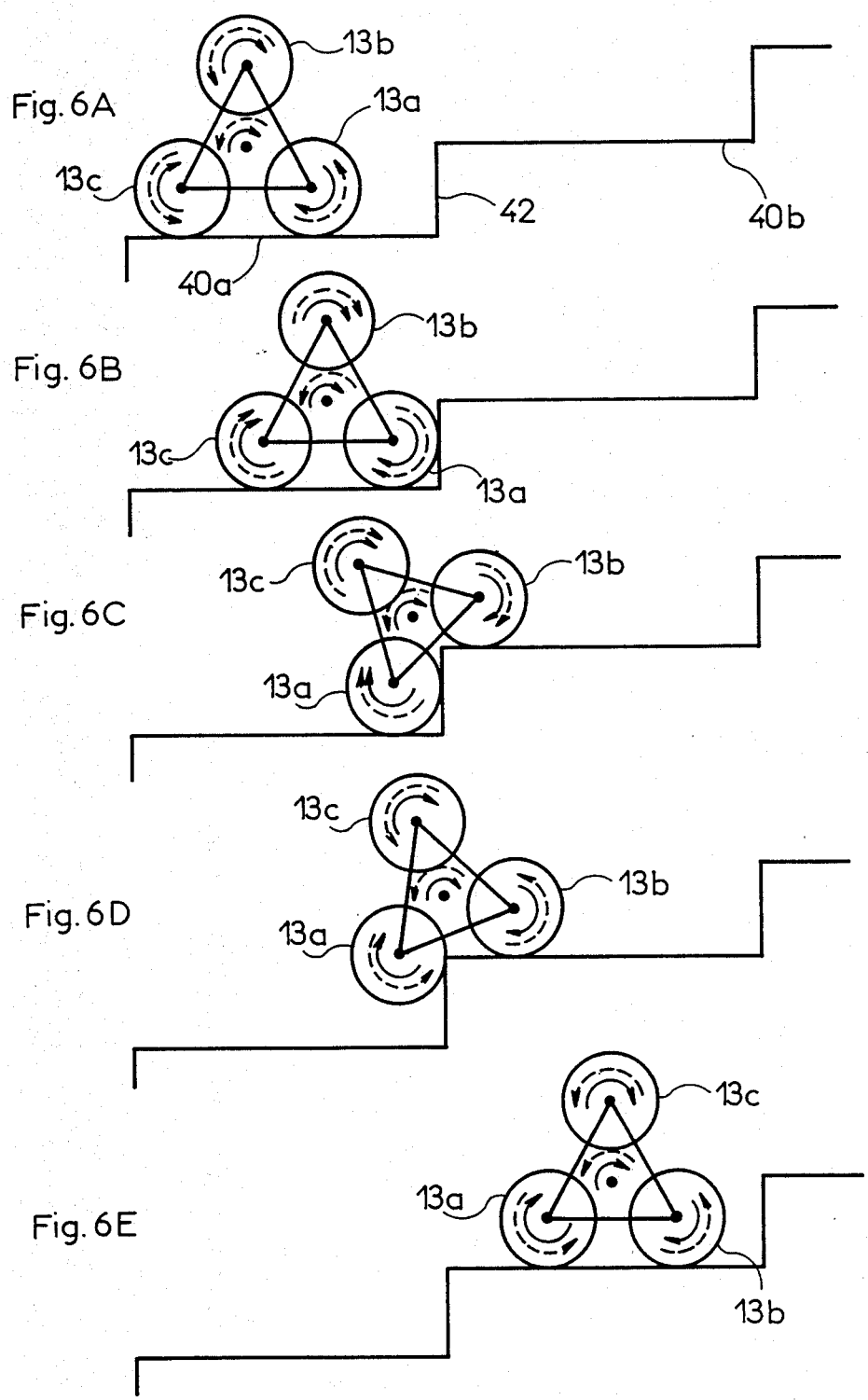

MOTORIZED MOVING DEVICE

BACKGROUND OF THE INVENTION

1. Field of the Invention

The present invention relates generally to transport devices and in particular to a motorized moving device adapted for installation on any type of vehicle or receptacle for persons or objects, in particular on an armchair for invalids, handicapped people, etc.

The invention relates more specifically to a motorized wheelchair for handicapped people which is able to go up and down stairs, negatiate sidewalk or pavement curbs, etc . . . , this chair being able to be used by the handicapped person without the help of an accompanying person.

2. Description of the Prior Art

The Italian industrial model patent filed on the 20 Nov. 1981 under the number 5071B/81 and the French patent application No. 82 04314 filed on the 15 March 1982 describe moving devices which comprise an axle, mounted on bearings, at each end of which a travelling assembly is provided comprising a certain number of wheels, most often three in number, their respective centers defining an equilateral triangle. The pivoting shafts of the three wheels, mounted freely rotatable, are joined together by appropriate frames. Thus, by rotating the axle such a moving device facilitates to a certain extent going up and down stairs, crossing pavement curbs, etc.

However, the handling of such devices remains delicate, necessitates the presence of an accompanying person and requires special attention on his part. In fact, this latter must always take care, when going up or down stairs, to pull the assembly towards him so that, in each travelling assembly, that one of the three wheels which strikes against the step immediately above (or below) to help crossing same is applied against the riser. In fact, if this condition is not fulfilled, there is a risk that, with the axle continuing to rotate, this wheel passes beyond the balance position and cannot come to bear on the upper step, and thus falls back again on the starting step. The jolt caused by such a fall may in some cases throw the user off his balance, with a great risk of falling.

SUMMARY OF THE INVENTION

The present invention aims at overcoming these drawbacks of the prior art and provides a moving device which greatly facilitates the movement of heavy loads on stairs, etc.

Another object of the present invention is to provide a moving device whose safety is substantially increased and which, in the case of a wheelchair for handicapped people, may be used without an accompanying person.

For this, the present invention provides a motorized moving device, of the type comprising a chassis equipped for receiving a person or an object to be transported, and an axle mounted for pivoting on the chassis in the lower region thereof, the axle comprising, fixed to each of its ends, a frame means, which pivotally supports at least three wheels, first reversible drive means adapted for rotating the axle, and second reversible drive means for selectively rotating the wheels independently of the rotation of said axle, wherein said first drive means drive the frame means through external hollow shafts integral with said frame means, and said second drive means drive said wheels through inner shafts which are coaxial and pivotally received in said external shafts.

BRIEF DESCRIPTION OF THE DRAWINGS

The invention will be better understood from reading the following detailed description of a particular embodiment thereof, given by way of example with reference to the accompanying drawings in which:

FIG. 1 is a schematical general perspective view of a motorized moving device in accordance with the present invention;

FIG. 2 is a front view in partial section of a part of the device of FIG. 1;

FIG. 3 is a side view of the part of the device shown in FIG. 2;

FIG. 4 is a schematical side view for illustrating the operation of the moving device;

FIG. 5 is a schematical perspective view of an accessory means provided in the device of FIGS. 1 to 4; and FIGS. 6a to 6e show very schematically successive steps of the device of the invention negociating stairs.

DESCRIPTION OF THE PREFERRED EMBODIMENT

Referring to the drawings, and in particular to FIGS. 1 to 3, a motorized moving device of the invention is mounted, in the present example, on the chassis 10 of a wheelchair for handicapped people, invalids, etc.

The device comprises, below the frame 10 and respectively in the two side regions thereof, two travelling assemblies comprising three wheels, generally shown at 12, which each comprise three wheels 13 mounted for pivoting on associated triangular support frames 14, the pivoting shafts 16 of said wheels 13 passing through the triangular frames in the region of the apices thereof. With particular reference to FIG. 2, in which only a single travelling assembly has been shown for the sake of simplicity (the other travelling assembly being of course symmetrical to the first one with respect to the central longitudinal axis of the wheelchair), it may be observed that each frame is formed of two vertical parallel plates 14a, 14b in the form of an equilateral triangle which extend on each side of the three associated wheels 12 and between which the shafts 16 of said wheels extend horizontally. It may be noted here that shafts 16, besides providing pivotal mounting of wheels 13, also provide interlocking of the two plates 14a, 14b.

The device further comprises means for rotating each frame. As is shown particularly in FIG. 2, the means for rotating frame 14 comprise a first shaft 18 which is fixed by its right hand end substantially in the center of the inner plate 14a of the frame, by any appropriate means such as welding, etc. For purposes explained further on, shaft 18 is hollow. This shaft 18 is pivotally received in an appropriate bearing 20 provided at the lower end of the two supporting uprights 22 fixed by their upper ends in the lower region of chassis 10. The means for rotating the frame further comprise a toothed wheel 24 integral with shaft 18 which meshes with a driving tangential worm screw 26 fixed to the chassis. As will be seen further on, the worm 26 may be driven by appropriate drive means comprising electric motor 27 for thus causing frame 14 to rotate in one direction or in the other. Of course, a similar drive device driven by the same power source and in synchronism with the first one is provided on the other side for the second frame (not shown). It may be noted here that the worm and gear transmission described above is of the driving worm type, that is to say that only the worm screw is able to drive the gear wheel, this latter not being able to transmit to the worm screw a rotation such as the one which it might acquire independently (when going downstairs for example, for obvious safety reasons).

The moving device of the present embodiment of the invention further comprises means for rotating the wheels 13. These means comprise a second rotary shaft 30a which is received freely rotatable inside the first shaft 18 and coaxial therewith. The right hand end of shaft 30a (FIG. 2) projects rightwardly beyond the inner plate 14a of frame 14, and is fixed to a driving gear wheel 32. Gear wheel 32 meshes with three driven gear wheels 34, all of the same diameter, which are mounted respectively on the rotational shaft 16 of wheels 13 and which are locked for rotation therewith. Shaft 30a is adapted to be rotated in one direction or in the other by its left hand end, at the output of a differential mechanism 36 described hereafter. Similar drive means are provided for the three wheels of the other travelling assembly of the device, not visible in FIG. 2.

It is thus possible, by means of the second drive means, to rotate the three wheels 13 of each travelling assembly with a homokinetic movement in one direction or in the other.

Referring to FIG. 4, the operation of the moving device such as partially described up to now may be described schematically. If the moving device is used for climbing stairs, two successive steps of which have their treads 40a and 40b separated by a substantially vertical riser 42, frame 14 is then rotated in a clockwise direction in FIG. 4 (arrow 44), in a conventional way. Simultaneously, the second drive means are brought into action for rotating the three wheels 13 also in a clockwise direction (arrow 46), that is to say that the inner shaft 30a will be driven in a direction opposite that of the outer shaft 18 because of the reversal of the rotational direction at the level of the transmission between the gear wheels 32, 34. Such a drive torque exerted on wheels 13 advantageously causes the wheel, shown at 13a in FIG. 4 and called "bearing wheel" about which the frame 14 pivots which is at the origin of climbing onto the upper step, to be applied against the riser 42, and thus stabilizes this wheel 13a while firmly maintaining it in the corner defined by the lower step 40a and the riser 42. The rotation imparted to the wheels 13 also causes the upper wheel, shown at 13b, to engage the edge of the immediately upper step 40b with greater safety, thus further promoting climbing.

The rotational speeds and drive torques exerted respectively on frames 14 and on wheels 13 may, as has been mentioned, be totally independent of each other; however, in a simplified version, single transmission means may be provided for the frames and the wheels.

During use of the moving device of the invention on straight stairs, wheels 13 must be rotated substantially at the same speed, at least during the phase of rolling over the tread between two successive step rises, so that the bearing wheels (wheel 13a in FIG. 4) abut simultaneously against the riser 42 before climbing the following step. However, for spiral stairs, during such rolling over the tread the wheels of the outer travelling assembly (the furthest from the ramp) must be rotated at a speed greater than that of the wheels of the inner travelling assembly. In an extreme case, it is even possible for the speed of the inner wheels to be zero.

For this, and again with reference to FIG. 2, the moving device of the invention further comprises differential type transmission means for driving the wheels 13. More precisely, each of the shafts 30a, 30b which transmit the torque to their associated group of wheels ends in a spider pinion respectively 50a, 50b. The spider pinions 50a, 50b mesh with a planet wheel 52 which is mounted for free rotation on shaft 54 integral with a cage 56. The cage 56 comprises a ring gear 58 which receives the drive torque from a drive pinion 60 itself driven by the electric motor 29 associated with appropriate accumulators.

The differential transmission means further comprise, mounted appropriately but not illustrated on the uprights 22 which support the bearings 20, two electrobrakes, shown schematically at 62a, 62b, associated respectively with the drive shafts 30a, 30b for the wheels 13. Preferably, the electrobrakes 62a, 62b are of the voltage presence type, that is to say that they are only active when an electric voltage is present at their terminals. Depending on the case, one or other of the electrobrakes, more precisely the one which is situated on the inner side of a spiral staircase, is used for going up or down such a staircase, for locking rotation of the wheels 13 of the associated travelling assembly 12. It thus becomes possible to use such a moving device on spiral or more generally turning, stairs with safety and without any risk of lateral destabilization, the inner wheels being held in readiness, by means of the associated electrobrake, until the outer travelling assembly, after having travelled an appropriate distance over the tread, is ready to climb up (or down) the next step, its "bearing" wheel being then suitably in abutment in the corner (see above).

Such a differential transmission system may advantageously be used for controlling the direction of movement of the assembly over a horizontal surface (locked frames), a controlled slowing down or stopping of the rotation of one of the groups of wheels 13 allowing the assembly equipped with the moving device of the invention to be rotated towards the left or towards the right, or else to be caused to pivot on itself.

Furthermore, a third electrobrake (not shown) may be provided which will be mounted on the rotating cage of the differential and adapted for locking rotation of the planet wheel 52, so as to obtain a perfectly homokinetic rotation of the two wheel assemblies, more particularly for a movement of the device strictly in a straight line and so as to avoid any slipping of the wheels 13.

As will be seen in greater detail further on electronic means may be provided for controlling, coordinating and servo-controlling the different movements of the device of the invention during climbing up or down movements in stairs, as well as on flat ground.

The moving device of the invention further comprises means for detecting and controlling the tilting of the load moved. It is desirable, for safety reasons, particularly when the chassis 10 on which the device is mounted is equipped with a chair, and when it is therefore a question of transporting handicapped people, invalids, etc, to avoid any untimely rocking of the assembly, particularly during operations for climbing up or down stairs, during which the available bearing points are more reduced and less "reliable" than during movement over flat ground.

Referring to FIG. 5, the tilt detection means 68 comprise, at an appropriate position on chassis 10 which depends on the type of transport associated with the moving device, a disk 70 which extends substantially vertically and which is mounted for free rotation on a horizontal shaft 72 passing through its center and fixed to the chassis. The disk has a counterweight 74 in its lower region, such that it is able to serve as verticality reference. The tilt detection means further comprise an optical system which is formed, in the present embodiment, by a light source 76, such as a light emitting diode, an oblong slit 78 formed substantially horizontally in the upper region of the disk 70 diametrically opposite the counterweight 74, and two photodetectors 80, such as semiconductor photoelectric cells which are disposed in the alignment of the light source 76. The assembly formed by the light source 76 and the photodetectors 82 is mounted on a stirrup (not shown) whose position about disk 70 is adjustable.

It is thus possible to have available at the output of the above described detector 68 electric signals which are representative of the tilt variations of the chassis with respect to a reference orientation (which will the most often be the orientation of stability, in which the center of gravity of the transported assembly is aligned vertically with the axle of the moving device). For example, the optical system may be designed so that, when the tilt is correct, the two photodetectors light up with the same intensity and, when the tilt varies in one direction or in the other, one of the two photodetectors receives a lower light intensity and the other a higher intensity. So as to avoid the action of parasite lights, the optical system will preferably be fitted in an appropriate dark box (not shown).

The servo-controlled means controlling the slant further comprise, in a way not illustrated, means for controlling the drive and transmission assemblies of frames 14, which receive the signals delivered by the detector 68. In fact, if the angular speed of the wheels is greater than the angular speed of the frames, the chassis tends to fall forwards or rearwards (depending on the direction of rotation), and reciprocally, and it is thus possible, by such a servo-control, to offset the tilt variations of the chassis by immediate actions at the level of the control controlling the rotation of the wheels and of the frames. The assembly may therefore be maintained at a substantially constant tilt by such immediate and low amplitude actions which will be superimposed on the movements for climbing up and down stairs.

The means 68 for detecting the tilt variations of the device about its point of stability may be formed by any other device, such as an optical system comprising not two but a ramp of photodetectors or else a stress gauge system.

FIGS. 6a to 6e, in this order, are for illustrating successive steps in operation of the device when climbing up stairs in relation with the continuous line arrows illustrating rotational directions. These Figures, in the order of FIG. 6e to FIG. 6a are also intended to illustrate operation of the device when going down stairs in relation with the dotted arrows which indicate rotational and/or stress directions.

For climbing up, a first step is illustrated in FIG. 6a. The device rests by its two wheels 13a and 13c (and the symmetrical wheels not shown) on the tread 40a of a step. The wheels rotate in a clockwise direction until the "front" wheel 13a abuts against the riser 42 (FIG. 6b) and then the wheels are blocked, their drive motor continuing to apply a drive torque.

At this moment, the motor driving the frames is brought into action whereas the wheel motor is kept in action but with a reduced electromotive force so that the wheel 13a remains in abutment (more particularly in the case where the stairs have a slope tending to cause the device to move back) without causing excessive over heating of the wheel motor. The wheels then pass from the position shown in FIG. 6b to that of FIG. 6c in which the wheel 13b comes to rest on the tread 40b of the following step.

FIG. 6d shows a subsequent step during which the device rises up onto the tread 40b while bearing on wheel 13b, the two motors being driven. Once the device rests by its two wheels 13b and 13a on tread 40b, as shown in FIG. 6e, we have come back to the condition shown in FIG. 6a. The frame motor is stopped and the wheel motor is again placed in normal operation.

For going down, starting from the position shown in FIG. 6e where the wheels rotate at a low speed in the direction shown by the dotted arrows, we pass to the position shown in FIG. 6d in which wheel 13a is in the air.

The chair begins to slant and this slant is detected by a slant detector such as the one shown in FIG. 5. At this moment the frame motor is started up whereas the wheel motor torque is modifed or reversed so that the wheels are braked. Thus wheel 13a moves down while remaining engaged against the riser. This reversal of the rotational drive direction is maintained while passing from the position shown in FIG. 6c to 6b.

It is only when the position illustrated in FIG. 6b has been reached that the frame motor is stopped and the wheel motor is driven in a direction for moving the device to the position illustrated in FIG. 6a and the cycle is repeated at the following step.

For putting into practice the procedures described in relation with FIGS. 6a to 6e and 6e to 6a, as information detectors, on the one hand, a counter electromotive force detector such as voltmeter 31, associated with the wheel drive motor and, on the other hand, a slant detector such for example as the one described with reference to FIG. 5 will be used.

Means are provided for ensuring safe and reliable operation in one or other of three possible configurations.

In a first configuration for normal movement in which two wheels of each frame are set on the ground, the tilt detector acts on the frame drive motor for maintaining a substantially constant tilt (or slant).

In a second configuration for climbing up stairs or sidewalks, the rotational speed of the wheels is limited and detector 31 detecting the counter electromotive force (c.e.m.f.) of the wheel motor is brought into action as soon as a variation of the c.e.m.f. is detected by voltmeter 31, indicating abutment of the front wheel against a riser. At that moment, the frame is set in rotation by control 33 to rotate through 120° whereas a torque continues to be applied to the wheels in the advancing direction.

In a third configuration for going down stairs, the tilt detector detects the moment when the chair begins to lean, indicating that a front wheel has gone beyond the surface of a step. From that moment, it starts up the frame motor for a 120° rotation and controls the wheel motor so that the wheels are under braking, so that the descending wheel remains engaged against the riser. During this phase of rotation of the frame, its speed of rotation is controlled by the tilt detector so that the chair remains with a substantially constant tilt.

The different means described above which form the motorized moving device of the invention may be brought under the centralized control of a digital unit, such as a microprocessor. In particular, in a memory associated with this latter information may be provided concerning the journeys most often effected, which will prove particularly useful in the case of an application to wheelchairs for handicapped people. In the case where the device is mounted on a chassis on which operating or gripping handles are provided, it will be advantageous to provide the different members controlling the movement in the region of these handles.

Furthermore, so as to obtain great precision not only in the movement of the device but also in maintaining its stability, the drive motors used may be of the stepper type.

Finally, any supplementary means for improving the safety may be provided in association with the device of the invention. In particular, when used on relatively confined spiral stairs, it may happen that the depth of the steps on the inside of the stairs is too small for providing the inner "bearing" wheel with a satisfactory support for climbing up the steps, since this wheel may easily slide and lose its grip. In this case, it will be useful to provide, in the inside region of the stairs, and therealong, auxiliary cable, rack, etc. holding means adapted for cooperating with complementary means provided on the chassis 10.

Finally, the present invention is not limited to the embodiment described but includes any variant or modification thereof which may be made by a man skilled in the art.

In particular, the electric power supply source may consist either of one or more accumulators mounted on the chassis or else, for example in the case of domestic use, may consist of an external source such as the mains voltage, connected to the device by a conducting cable which may be associated with a cable winder or similar. It is also possible to equip a staircase with two power supply rails running alongside the path which the device is to travel over, corresponding brush contacts being provided on the device for picking up the voltage present between the two rails all along the path of movement.

Finally, the transport device may be designed so that it is demountable so as to change over for example from a goods handling chassis to a wheelchair chassis for a handicapped person.

Of course, means may also be provided for disconnecting one or more of the different servo-controls so as to allow direct manual control of the motors.

What is claimed is:

1. A motorized vehicle for transporting a person or an object over an external configuration which includes a flat surface, steps up and steps down, said vehicle comprising:
   a. a chassis equipped for receiving a person or object to be transported;
   b. a first axle mounted on said chassis in a lower region thereof for pivotal movement on a first axis;
   c. frame means fixed to an end of said first axle;
   d. at least three wheels pivotally supported on said frame means;
   e. first reversible electric-motor drive means coupled to said first axle for rotating said first axle;
   f. a second axle mounted on said chassis for pivotal movement on said first axis, said first and second axles being coaxially and concentrically mounted on said first axis, said first axis being the sole axle-axis on said chassis, said second axle being coupled to said three wheels;
   g. second reversible electric-motor drive means coupled to said second axle for selectively rotating said second axle thereby to rotate said three wheels independently of the rotation of said first axle;
   h. detector means on said chassis for detecting the tilt of said chassis;
   i. means on said chassis for detecting counter electromotive force of the second drive means; and
   j. control means for actuating said first and second drive means in respose to signals from both detector means, said tilt detector means acting through said control means on said first drive means to maintain a constant frame tilt by accelerating, slowing down, or reversing the direction of rotation of said first drive means in response to signals from said tilt detector means.

2. Apparatus according to claim 1 wherein said control means actuates said first and second drive means in response to signals from both detector means and also in response to the external surface configuration including moving said chassis over steps up and steps down, said tilt detector means operating to detect when a first wheel abuts against the riser of a step and causing said frame to rotate so that a second wheel goes on to an upper step and then causing said frame to rotate further so that the second wheel rotates on the upper step while said first wheel rises against said riser.

3. The device as claimed in claim 1, wherein in the normal movement configuration, the tilt detector acts on the first drive means for maintaining a substantially constant tilt.

4. The device as claimed in claim 1, wherein, in the climbing up configuration, the counter electromotive force detector is used for indicating the abutment of a wheel against a riser and for consequently causing rotation of the frame through a predetermined rotation whereas a torque continues to be applied to the wheels in the advancing direction.

5. The device as claimed in claim 1, wherein, in the climbing down configuration, the tilt detector detects the moment when the wheelchair begins to lean at the end of a step for driving the first drive means through a predetermined rotation and for controlling the second drive means so that the wheels are under braking.

6. The device as claimed in claim 1, wherein, during all the intermediate movements, the tilt detector acts on the first drive means for maintaining a constant tilt by accelerating, slowing down or reversing the direction of rotation of said first drive means.

* * * * *